United States Patent [19]

Voermans

[11] 3,999,507
[45] Dec. 28, 1976

[54] APPARATUS FOR PRODUCING ARTICLES OF REINFORCED PLASTICS OR LIKE CONSTRUCTIONS

[76] Inventor: Ernst Theodoor Voermans, 9 White St., Clayton, Victoria, Australia

[22] Filed: Sept. 5, 1975

[21] Appl. No.: 610,881

Related U.S. Application Data

[62] Division of Ser. No. 369,136, June 12, 1973, Pat. No. 3,928,674.

[52] U.S. Cl. .................................... 118/34; 26/51; 118/320; 427/171

[51] Int. Cl.² ................. B05B 13/02; B05B 13/06; B05C 7/00

[58] Field of Search ............... 118/36, 33, 34, 305, 118/306, 315, 318, 320, 321, 325, 503; 427/171, 183, 233, 425; 425/66, 111, 404, 445; 26/51, 88, 89, 90

[56] References Cited

UNITED STATES PATENTS

| 2,510,313 | 6/1950 | Houth et al. | 26/51 X |
| 2,945,283 | 7/1960 | Harmon et al. | 26/90 X |
| 3,149,003 | 9/1964 | Christie et al. | 118/34 |
| 3,667,422 | 6/1972 | Saladin | 118/34 |

*Primary Examiner*—Louis K. Rimrodt
*Attorney, Agent, or Firm*—McGlew and Tuttle

[57] ABSTRACT

Apparatus for forming articles by making a base of stretchable fabric, holding the base in stretched condition at opposed ends, rotating the base and coating the base with a curable plastic material.

4 Claims, 9 Drawing Figures

APPARATUS FOR PRODUCING ARTICLES OF REINFORCED PLASTICS OR LIKE CONSTRUCTIONS

This is a division of application Ser. No. 369,136 filed June 12, 1973 now U.S. Pat. No. 3,928,674 granted Dec. 23, 1975.

BACKGROUND OF THE INVENTION

1. Field of the Invention.

The invention relates to apparatus for producing articles of reinforced plastics or like construction.

2. Description of the Prior Art.

The common processes for forming plastics articles, such as molding or extruding, are well suited to mass producing many identical products, but they are not readily adaptable to applications which call for the production of relatively small numbers of a wide variety of different shapes. For example, in conventional molding a different mold is required for each shape to be produced and the cost of a complex mold is only justifiable when large production runs are contemplated. Similarly, the application of extrusion processes is limited to those cases in which the articles to be produced are of constant cross-section.

BRIEF SUMMARY OF THE INVENTION

The invention provides an apparatus for producing articles of reinforced plastics or like construction which is readily adaptable to the manufacture of a wide variety of different shapes. This apparatus is used for applying plastics or other material to base of flexible material whereby the plastics or other material adheres to the base, the base being moved and maintained under tension during such application. The base material may comprise a fabric of synthetic fibres. The fabric may be formed to a generally tubular configuration. The process preferably utilises plastics coating materials but other suitable material may be employed.

The invention also provides an apparatus comprising a support structure, a pair of end members mounted on the support structure for rotation or oscillation about a common axis and spaced apart from each other, drive means for synchronously rotating or oscillating the end members, holding means mounted upon the end members and adapted to grip or otherwise hold opposite ends of a flexible base placed between the end members and tension means to bias the ends away from each other thereby to place the base in tension when it is so held.

BRIEF DESCRIPTION OF THE SEVERAL VIEWS OF THE DRAWING

The invention is now described in detail with reference to the accompanying drawing in which.

DETAILED DESCRIPTION

The apparatus shown in FIGS. 1 to 4 includes a support structure 11 having a pair of longitudinal beams 12, 13 interconnected by lateral supports 14. One end of the support structure has an upstanding head stock 16, this being rigidly secured to beams 12, 13. The head stock includes an upright base structure 15 the upper end of which is fitted with a support structure 17 having a longitudinal cylindrical bore 18 with internal splines 19 and opening towards a rear end of the apparatus. A hollow cylindrical member 21 is carried in support structure 17. It has external splines which mate with the splines 19 so that it is slidable relative to support structure 17 but is constrained against rotation relative thereto. A hydraulic ram 22 has its casing secured to head base 15 and a free end of the plunger of this ram is secured to a projecting lug 23 on member 21 so that by extension or contraction of the ram the member 21 can be moved lengthwise of the apparatus in support structure 17.

Figure 1:
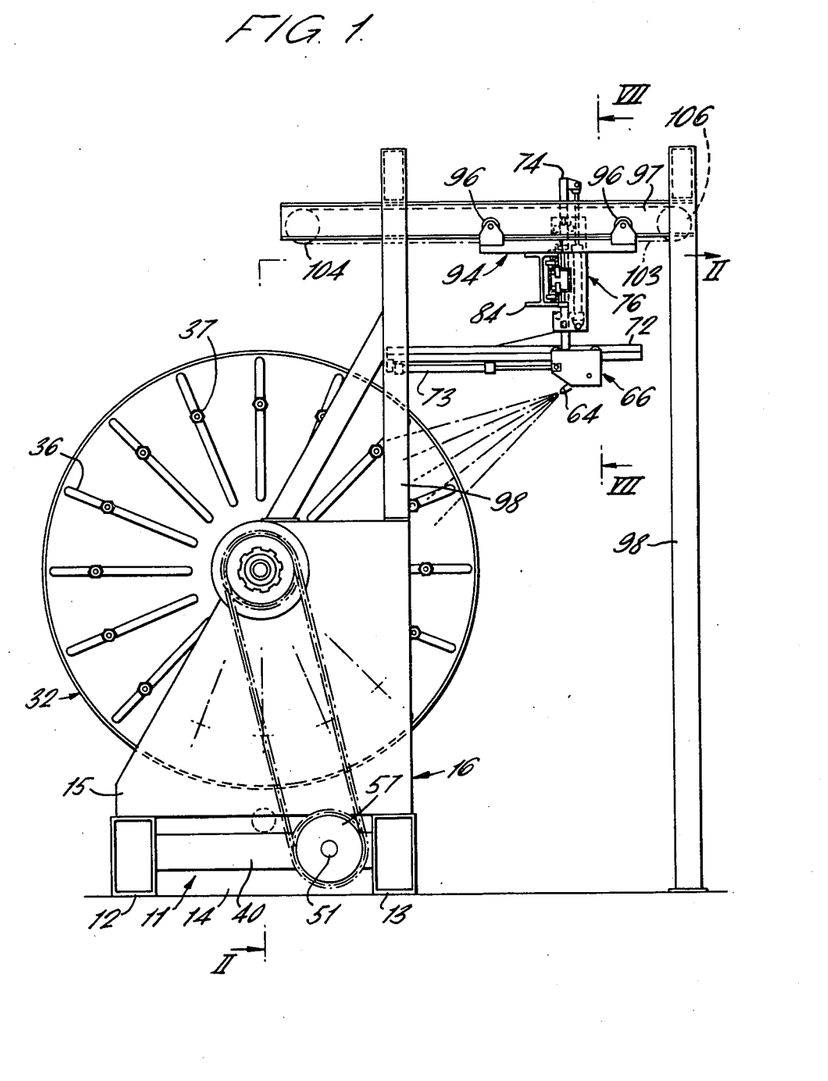
FIG. 1 is an end elevation of an apparatus constructed in accordance with the invention, a spray transport mechanism of the apparatus being viewed in transverse cross-section.
Figure 2:
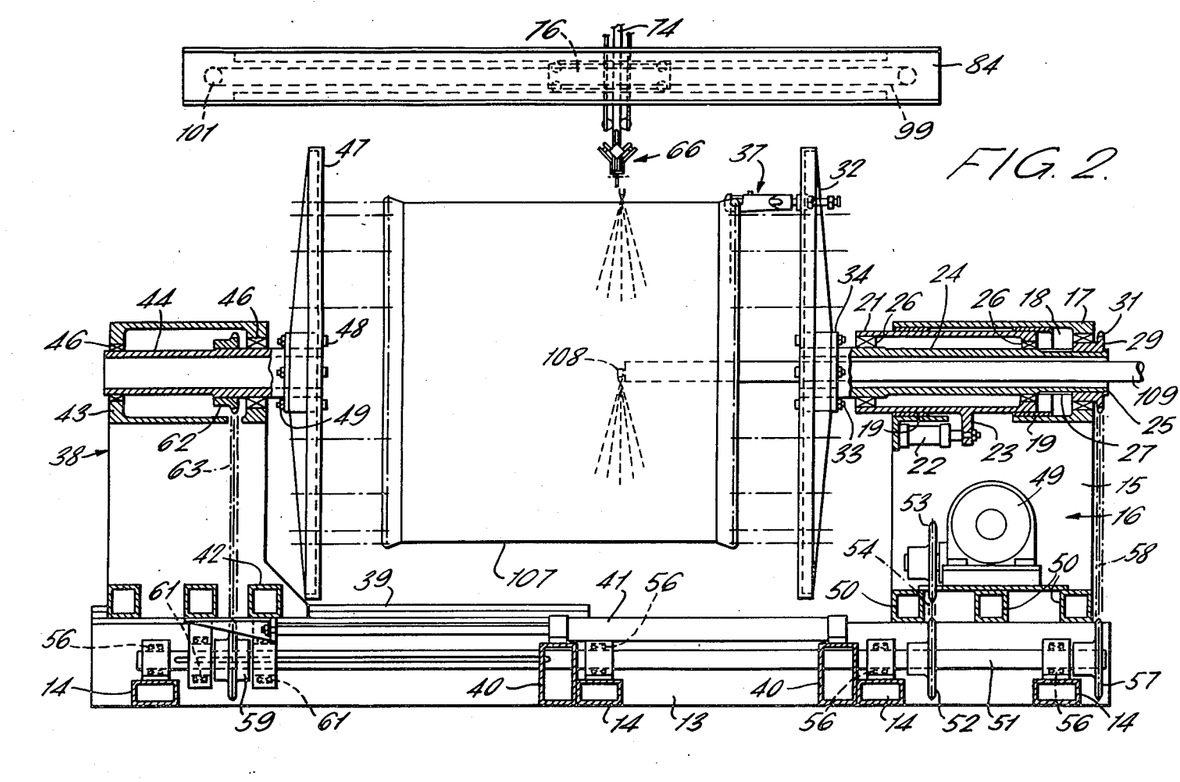
FIG. 2 is a cross-section of the apparatus of FIG. 1 viewed on the line II — II in FIG. 1.

A hollow shaft 24 is mounted in member 21 for free rotation, this mounting being effected by means of bearings 26 at each end of member 21. Bearings 26 constrain shaft 24 against axial movement relative to member 21. Shaft 24 projects, at an outer end 25, from member 21 and from the head stock. This outer end has splines 27 and a sprocket wheel 29 having a correspondingly splined bore is received on the splined outer end. Sprocket wheel 29 is mounted for free rotation in the outer end of support structure 17, this being by means of a bearing 31 which constrains the wheel against movement axially of the structure 17. Shaft 24 is thus rotatable by turning sprocket wheel 29 and because of the splined interconnection, this driving connection will be maintained even when the shaft is moved axially consequent to axial movement of the member 21.

The inner end of shaft 24 carries a disc 32. This is bolted to the shaft 24 by means of bolts 33 which pass through the shaft and through an outward flange 34 at the inner end of the shaft. Disc 32 has a plurality of equi-angularly disposed radial slots 36. Each slot carries a separate connector member 37 which can be locked in any desired position lengthwise of its slot. One connector member 37 is shown in greater detail in FIGS. 3 and 4. It includes a body part 151 having a head 152 and a cylindrical shank 153. Head 152 is of cylindrical configuration and of greater diameter than the shank 153 and has two parallel flat side faces 154 cut thereon, these extending from a transverse shoulder 156 joining the head to shank 153. The body part 151 is received in an associated slot 36 with the uncutaway part of the head abutting against the inner face 32(a) of the disc 32 and with the shank 153 extending towards head stock 16. The faces 154 are spaced apart a distance slightly less than the width of the slot 36 and are positioned within the slot, thereby preventing substantial rotation of the body part relative to the disc. Shank 153 has a threaded section 158 and the body part is clamped in a desired position lengthwise of the slot 36 by means of a nut 159 which is engaged upon this, a washer 161 being interposed between nut 159 and the outer face 32 (b) of the disc.

Figure 3:
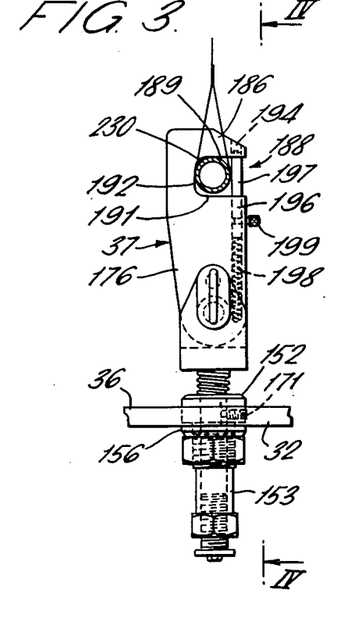
FIG. 3 is a fragmentary side view of a portion of the apparatus of FIGS. 1 and 2 showing the manner of attachment of a base to be coated.
Figure 4:
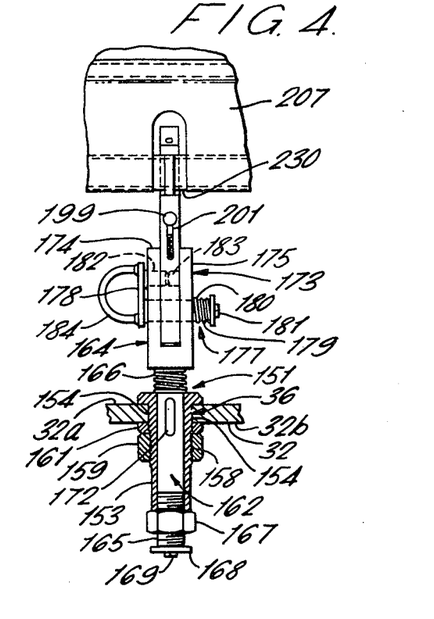
FIG. 4 is a cross-section on the line IV — IV in FIG. 3.

Body part 151 has a circular axial bore therethrough and this slidably receives a rod 162. Rod 162 carries at its outer end a head structure 164. A helical compression spring 166 is interposed between head structure 164 and head 152 of the body part 151 so as to resiliently bias the rod and the head structure away from the disc. The other end 165 of the rod is threaded and a nut 167 is received on this end of the rod so that movement of the head structure under the influence of spring 166 is thus limited to a position in which nut 167 engages the shank 153.

End 165 of rod 162 has a small diameter axial threaded bore therein and a washer 168 is secured to the free end of the rod by a screw 169 which passes through a central opening in the washer and which is threadably received in the bore. Washer 168 prevents nut 167 from coming loose from end 165 of the rod.

Rod 162 is constrained against rotation relative to body part 151 by means of a grub screw 171 which extends through head 152 normal to the axis of body part 151 and into an elongated lengthwise extending slot 172 in rod 162.

Head structure 164 includes a U-shaped yoke 173 having a pair of spaced apart parallel plates 174, 175. A hook member 176 is pivotally mounted on yoke 173, this hook member being secured for rotation, about an axis transverse to the axis of the rod 162, by a pivot pin 177 which extends through plates 174, 175. One end of pivot pin 177 projects from plate 174 and carries a radial arm 178.

Pivot pin 177 is axially slidable relative to yoke 173 but the end thereof carrying arm 178 is resiliently biased towards the yoke 173 by means of a helical compression spring 179 which is disposed around a projecting end 180 of the pivot pin opposite to the end carrying arm 178 and between a washer 181 secured between this end and plate 175. Arm 178 carries, at its free end, a pin 182 which extends generally parallel to pin 177 towards plate 174 and which can be moved, by axial rotational movement of pin 177, to a locking position in which it extends through an opening through plate 174 to be alignable with and enter an opening 183 extending transversely through hook member 176 thereby to lock the hook member in a position in which it extends generally axially of the rod 162. A part ring-shaped tab 184 is provided on arm 178 to facilitate this movement. The spring 179 operates to bias pin 182 inwardly of yoke 173 so that if hook member 176 is disposed in a rotational position in which opening 183 is not aligned with the opening in plate 174 and the pin is within the latter opening, the pin will bear against the side surface of the hook member and will automatically be entered into the opening 183 under the influence of spring 179 if correct rotational alignment of the hook member is subsequently effected, Of course, the pin can be withdrawn completely from the opening in plate 174 and arm 178 turned so that the spring 179 biases pin 182 against the plate 174 thereby freeing the hook member for free rotation.

Hook member 176 carries a claw-shaped outer part 186 which defines an opening 188 which extends laterally inwardly from one edge face of the claw member and which is defined by parallel sides 189, 191, transverse to the axis of rod 162, and an inner side 192 generally parallel to such axis. A bore 194 extends through outer part 186 parallel to but spaced from the axis of rod 162 and this is aligned with a bore 196 which extends through the remainder of the hook member. A pin 197 is slidably received in bore 196. It is biased towards outer part 186 by means of a compression spring 198 disposed between an inner end of bore 196 and an inner end of the pin. Movement of the pin is limited, at two extremes, by engagement of a grub screw 199, which is threadably received in a transverse bore in pin 197, with opposite ends of a slot 201 in the hook member and through which the grub screw 199 extends. Thus, pin 197 is normally biased to a position in which grub screw 199 engages the outermost end of the slot 201 and in this condition the free end of the pin projects into the bore 194. The pin can then be withdrawn into the remainder of the hook member by axial sliding effected by pushing the grub screw 199.

A tail stock 38 is longitudinally slidably mounted on a bed 39 supported on beams 12, 13 at the end thereof remote to head stock 16. A hydraulic ram 41 has its casing secured to cross members 40 which extend between beams 12, 13 and the free end of its piston is secured to a lateral support 42 on the tail stock so that, by extending or contracting ram 41 the tail stock can be moved longitudinally of bed 39 so as to vary its disposition relative to the head stock 16.

Tail stock 38 includes a base portion 45 which rests on bed 39 and a hollow cylindrical member 43 is fitted to the upper part of this portion. A hollow shaft 44 is freely rotatably mounted in member 43 by means of bearings 46 which constrain the shaft against axial movement relative to member 43. The innermost end of shaft 44 carries a disc 47 of identical configuration to the disc 32 and which is secured to the shaft 44 by means of bolts 48 passing through the disc and a flange 49 on the inner end of the shaft.

Disc 47 is fitted with connector members 37 identical to those in the disc 32, these being likewise received in the radial slots in the disc 47.

A motor 49 is mounted on supports 50 which extend between beams 12, 13, at the head stock end thereof, and this is drivingly coupled to a shaft 51 by means of sprocket gears 52, 53 and an interconnecting endless chain 54. Shaft 51 extends lengthwise of the apparatus between beams 12, 13, being carried by bearings 56 attached to the lateral supports 14. Shaft 51 carries a sprocket gear 57 which is interconnected to the sprocket gear 29 on the head stock by means of an endless chain 58. A further sprocket gear 59 is splined to the tail stock end of shaft 51 so that it is constrained for rotation with the shaft but is freely axially movable thereof. Gear 59 is disposed between a pair of collars 61 depending from the tail stock so that the gear is also constrained for longitudinal movement with the tail stock. A sprocket gear 62 is carried by shaft 44 on tail stock 38 and this is interconnected with gear 59 by means of an endless chain 63. Thus, when shaft 51 is turned by operation of motor 49, shafts 24 and 44 will be driven by the respective associated sprockets and chains. The drive ratio from gear 57 to gear 29 is arranged to be the same as that from gear 59 to gear 62 and so that the shafts 24, 44 are driven in the same rotational direction at the same speed. The splining of gear 59 on shaft 51 allows the gear to move axially of the shaft 51 when the tail stock is slid along the bed 39, without disturbing drive to the shaft 44.

Figure 7:
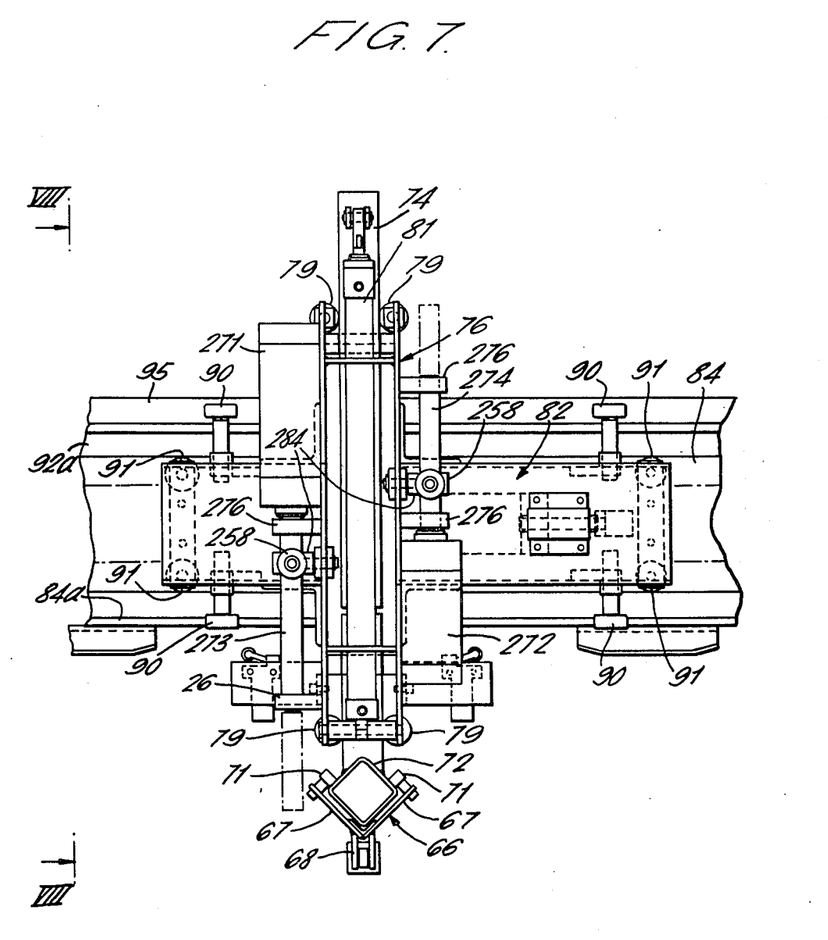
FIG. 7 is an enlarged fragmentary elevational view, substantially on the line VII — VII in FIG. 1 and showing a spray head positioning mechanism.

A plastics material spray head 64 is movable lengthwise of the mechanism and is also positionable in a horizontal plane and a vertical plane. It is carried by a first carriage 66 (FIG. 7) of V-shaped configuration having a pair of angularly disposed side plates 67. Plates 67 each carry separate pairs of wheels 71, which wheels 71 are freely rotatable about inclined axes transverse to the carriage. Wheels 71 engage a horizontal square section track 72 which extends transversely of the axis of rotation of shafts 44 and 24. Track 72 is arranged with two adjacent upper sides thereof extending in downwardly divergent relationship and it is on these two sides that the respective pairs of wheels 71 run. It will thus be seen that the wheels 71 permit carriage 66 to move lengthwise on track 72, and transverse to the apparatus.

Figure 8:
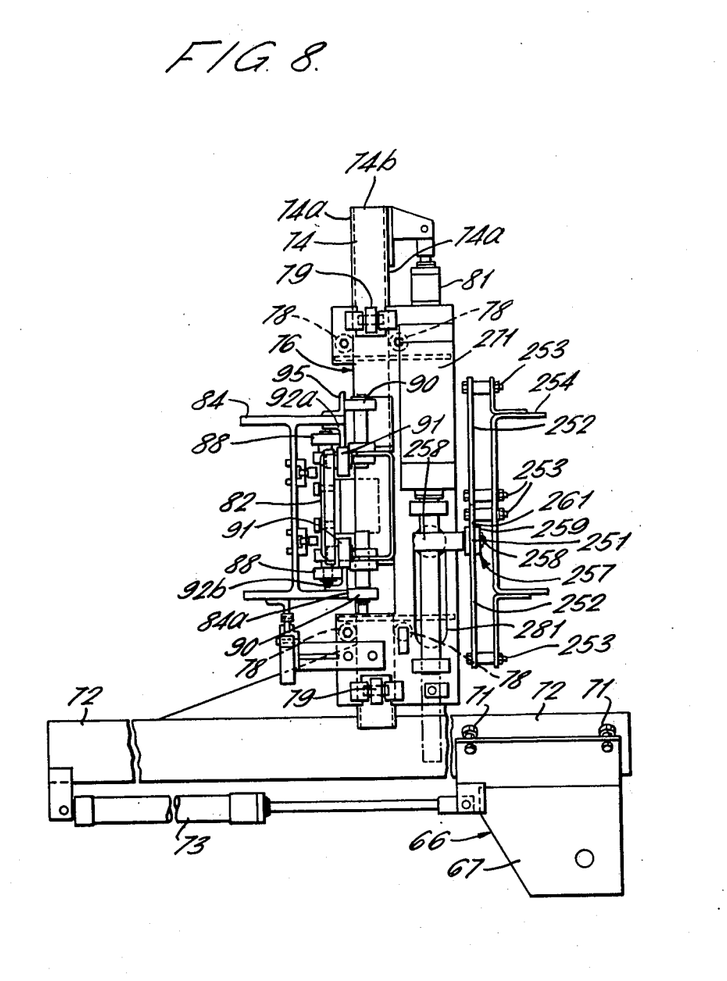
FIG. 8 is a cross-section on the line VIII — VIII in FIG. 7.

A hydraulic ram 73 (FIG. 8) is interconnected between carriage 66 and one end of track 72, so that by extension or contraction thereof, the carriage 66 can be positioned, in a horizontal plane, at a desired distance from the common axis of the shafts 24 and 44.

Figure 9:
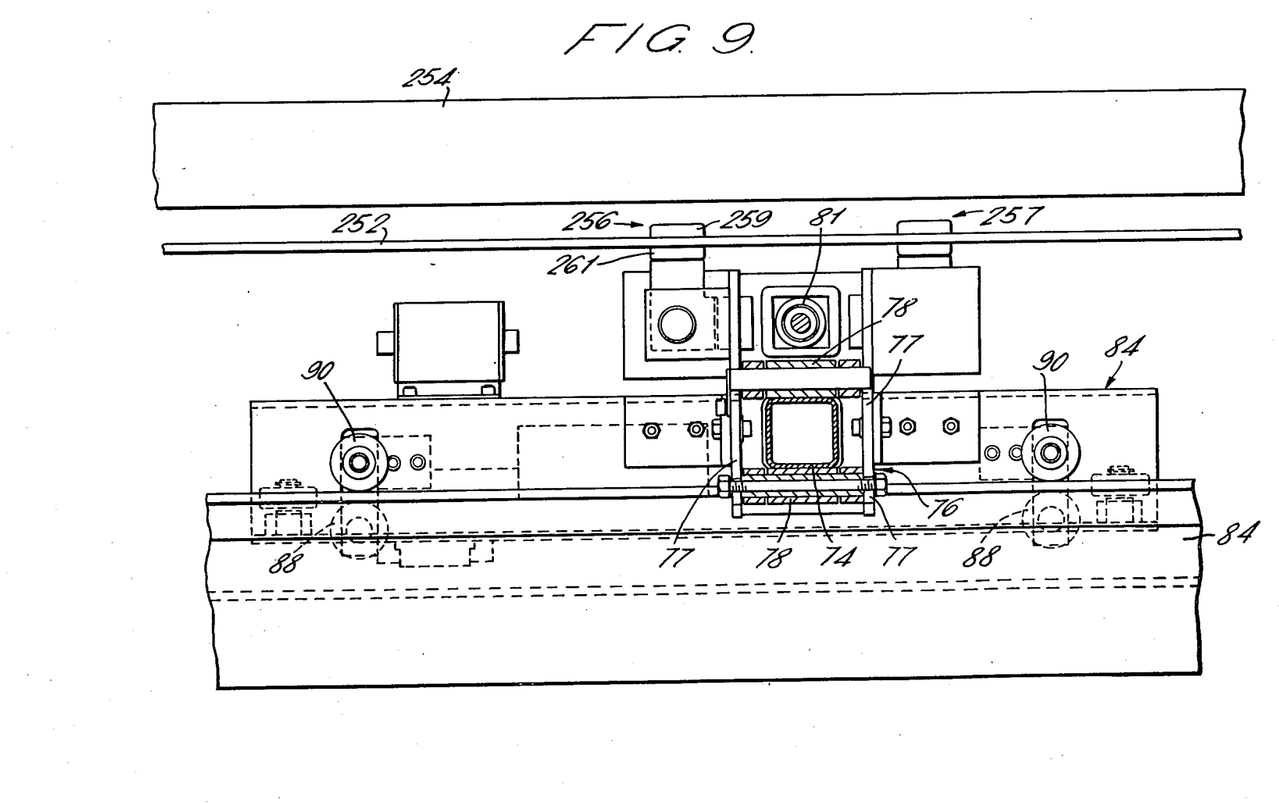
FIG. 9 is a plan view of the mechanism shown in FIGS. 7 and 8.

Track 72 is connected to an upright slide 74 which extends from an upper edge thereof and which is of rectangular cross-section. This slide is vertically slidable relative to a second carriage 76. Carriage 76 has a pair of spaced apart side plates 77 (FIG. 9) and the slide is constrained against movement in planes transverse to the apparatus by four wheels 78 carried by carriage 76, the wheels 78 being rotatable about horizontal axes and being disposed two to each of the sides 74a of the slide which are parallel to the length of the apparatus. Movement in planes parallel to the length of the apparatus is prevented by four wheels 79 on carriage 76, these being rotatable about horizontal axes and disposed two to each of the sides 74b of the slide transverse to the length of the apparatus.

A vertical hydraulic ram 81 is interconnected between carriage 76 and slide 74 whereby extension and contraction thereof causes vertical movement of slide 74 and accordingly corresponding movement of track 72 and carriage 66.

Side plates 77 of carriage 76 are interconnected by a horizontal hollow rectangular-section member 82 and this member carries wheels which support the carriage 76 for horizontal movement lengthwise of the apparatus and lengthwise of an eye-beam 84. These wheels include wheels 88 which are arranged for rotation about vertical axes and which bear upon oppositely directed vertical side flanges of upper and lower angle members 92a, 92b secured to beam 84 and wheels 90 which are rotatable about vertical axes. These wheels 90 bear against a second upper angle member 95 secured to beam 84 and against a lower flange edge 84a of beam 84. Pairs of wheels 91 also bear against edges of angle members 92a, 92b.

Beam 84 is carried by a pair of third carriages (FIG. 1) 94 which are spaced apart lengthwise of the apparatus and movable horizontally in a direction lateral to the apparatus. Carriages 94 have wheels 96 which engage opposite lower flanges, of horizontal eye beams, 97, which extend in parallel directions transverse to the length of the apparatus. Beams 97 are rigid with support 11 being supported on upright members 98 at opposite ends of the machine.

Carriage 76 is connected to one run of an endless belt 99 which runs lengthwise of beam 84 on end rollers 101, 102, Means (not shown) is provided for turning either one of rollers 101, 102 to effect movement of the belt and thus to move carriage 76 lengthwise of beam 84. Likewise, carriages 94 are connected to lower runs of belts 103 which run lengthwise of beams 97 and about end rollers 104, 106. Means (not shown) is likewise provided for rotating either of the rollers 104, 106 to effect movement of the belts 103 and thus to move carriages 94 lengthwise of the associated beams 97.

The transport mechanism enables considerable flexibility in setting up desired movements of the nozzle 64 lengthwise of the apparatus. In particular the nozzle can be positioned horizontally in a lateral direction, towards and away from the common axis of rotation of the discs 32 and 47, by manipulation of ram 73 and can be positioned at a desired vertical height by manipulation of ram 81. It can then be made to traverse the length of the apparatus by movement of the carriage 76, or to move in directions towards and away from the axis of rotation of the discs by movement of the carriages 94.

Cam means is provided for moving carriage 66 such that, during movement lengthwise of the apparatus, it follows a desired contour of movement in a vertical plane and a desired contour of movement in a horizontal plane. Thus, desired horizontal and vertical contours are defined by slots 251 extending in respective vertical cam plates 252. Each plate 252 is secured, by means of bolts 253, to a channel member 254 which extends lengthwise of the apparatus. Two cam followers 256, 257 are engaged one within each slot 251. These each include a transversely extending pin 258 with washers 259, 261 disposed thereon one to either side of the associated plate 252.

Carriage 76 carries two vertically disposed hydraulic cylinders 271, 272. These have plungers 273, 274 which are mounted in bearings 276 for up and down sliding movement. The pins 258 on the cam follower plates 257 are secured one to each of these plungers so that up and down movement of the followers 256, 257, pursuant to following of the contours of the slots 251 as the carriage 76 is moved lengthwise of the apparatus, causes corresponding up and down movements of the plungers 273, 274. The movement is limited to upper and lower positions by opposite end surfaces of vertical slots 281 in the side plates 77 of the carriage 76. These slots receive projecting stops 284 on the plungers.

The cylinders 271, 272 are connected in hydraulic circuits with the cylinders 73 and 81 so that variations in pressure in the cylinders 271, 272 pursuant to up and down movement of the plungers thereof is caused to effect corresponding up and down movements of the plunger of cylinder 81, to give vertical movement of track 72, and corresponding horizontal movement of the plunger of cylinder 73 to move carriage 66 horizontally along track 72. Thus, one of the cam slots 251 will represent a pattern of actuation of the cylinder 81 to effect variable vertical positioning of carriage 66 while the other slot represents a pattern of movement to effect variable horizontal positioning of the carriage.

The general mode of use of the apparatus to form a hollow cylindrical tube will now be described. Firstly, a base 107 of stretchable woven synthetic material of tubular cnfiguration is secured to discs 32 and 47 so as to extend between them in open configuration. In this instance, loops 230 of flexible material are sewn into opposite ends of the tubular base and hooking onto these loops is effected by use of the connector members 37 on each disc. The desired cross-section of the tube having been selected, the connector members 37 are positioned on each disc 32 and 47 in a corresponding array. For example, if a circular section is desired, the connector members 37 on each disc will be disposed equi-radially of the disc. If a square-section tube is desired, they could be arranged in a square array on the disc. Positioning of the members lengthwise of the associated grooves is effected by first loosening nuts 159. To effect connection of a member 37 to the base, the arm 178 there of is first moved to withdraw pin 182 from opening 183 and from the opening in plate 174 and swung to engage the outer side face of the plate thereby freeing the hook member to allow it to be manipulated to position it for connection. The pin 197 is then moved, by sliding screw 199 to allow the loop 230 to be passed into opening 188 on the hook member. The screw 199 is then released so that the pin 197 is moved to close opening 188 and retain the loop therein. Arm 178 is then moved to re-enter pin 182 within the opening in plate 174 and the hook member shifted, if necessary, so that the pin 182 enters the opening 183, under the influence of spring 179, to secure the hook member relative to the disc. Tail stock 38 can be moved by manipulation of ram 41 to position the tail stock for easy connection of the base to the discs 32, 47. After attachment, the base is placed under tension by movement of ram 22 to withdraw disc 32 away from disc 47. The mechanism is then set in motion with the discs 37 and 42 rotated together with the base and the exterior of the base is coated with a suitable plastics material sprayed from head 64. It will be appreciated in this respect that by suitable selection of the material of the base, the tension applied to the base and the rotational speed thereof, it is possible to conform the base to different lengthwise configurations. The speed of rotation of the base will normally be determined in accordance with the base, being selected to maintain the peripheral speed of the base within a range suitable for coating.

With practice, it has been found to be a very simple task to select rotational speeds appropriate to desired conditions.

The coating of the base is effected by traversing the base lengthwise by the head 64 as the base is rotating, this being effected by appropriate manipulation of one or more of the various carriages which support head 64. Normally, this will be effected merely by movement of carriage 76 lengthwise of beam 84 in some predetermined path parallel to the length of the apparatus, this being selected by positioning of the beam 84, mounted on carriage 94, at some appropriate position. A desired pattern of horizontal and vertical movement of head 64 during lengthwise movement of the apparatus is effected then in accordance with cam paths on the plates 252 as described previously. Such paths may be for the purpose of ensuring that the spray head follows contours of an object being formed. The movement could, however, be effected in other ways, indeed, even when automatic following is desired, this can be effected by suitable electrical control means rather than by the mechanical mechanism described.

Curing may be effected by immediate application of heat. Thus, the carriage 66 may carry heating elements or alternatively they may be located at positions where they can evenly heat the base as it rotates. Of course, curing can also be effected by other known techniques such as radio-frequency curing or by use of atomic radiation. If desired, coating of the interior of the base may be effected by means of the nozzle 108 shown in FIG. 2. This is carried at the free end of a tube 109 which is inserted within hollow shaft 24 so as to project into the interior of the base. Similar coating could, of course, be effected by inserting the tube through shaft 44.

When curing of the plastics material has advanced to a stage sufficient to impart adequate rigidity to the base, the motor 49 can be stopped and the base removed.

If desired, one or more futher coatings can be effected. Also, a further base could be placed over an already completed base and coated in a similar manner. Such operations can be repeated as often as required to build up any desired thickness.

In cases where tubes of circular cross-section are to be formed, connector members 37 of the discs may be disposed allowing the members to assume dispositions at will along the lengths of the associated slots. Normally though, if asymmetrical shapes are to be formed, it will be necessary to lock the members in desired arrays on the discs.

Suitable intermediate formers such as hoops may be placed within the base section to modify the cross-sectional size. Pairs of boat hulls, tanks and like articles may be formed in this manner. The cross-sectional size at any point along the length of the section may also be decreased by tying the base section or by using a suitable former to surround the base section. A plurality of necked containers may be simultaneously formed in this manner, by inserting formers within the tubular section and "pinching" the section inwardly at intervals along its length to form necks for the containers. Other articles can also be formed as separable multiple assemblies by securing a number of bases together by separable fastenings or by connections which can be cut or broken after coating.

The process is not limited to the use of a tubular sectioned base. For example, plain sheet material may obviously be used to produce any of the above described articles and channel shaped objects or articles of compound curvature may also be readily formed from such material. Again, lengths of material may be utilised. For example, a ladder may be formed by securing longitudinal runs of strip between the discs and merely stapling further lateral strips between the runs. The strip may then be coated in the same manner as described above. In any case, although stretchable base material is desirable, other flexible materials may be utilised. The base material may be in the form of woven or unwoven fabric but, likewise, other forms of material may be employed such as sheet plastics material. It might be in a form in which the full shape of the base becomes evident only when placed under tension in the apparatus.

EXAMPLE

The following describes an exemplary method of forming a pair of cylindrical 500 gal. capacity tanks. The base in this instance comprised two cup-shaped coaxial tank sections connected at base portions by short longitudinal substantially planar fins. The tank sections were formed by sewing a double layer of 143 Style E glass fibre fabric with a nominal weight of 8.78ozs. per square yard, of crow-foot weave and having a nominal thickness of 0.009 inch. The glass cloth had a vinyl trichlorosilane (Garan) type finish applied after prior removal of sizing by a high termperature heat-cleaning process. The fins were made up of multiple layers of glass fibre rovings woven in a plain weave with a nominal weight of 30ozs. per square yard per layer, and a nominal thickness of 0.094 inch per layer. The rovings were continuous soft strand rovings with 120 ends, spun from E glass. The base portions of the tank sections of the base were domed so that the space between these increased in a direction radially outwardly of the axis of the base. The fins were of substantially triangular form extending outwardly of the axis of the tanks at angularly spaced dispositions.

After the base was placed in the apparatus so that it was held by the free ends in taut condition, with the cup-shaped portions in a condition such that they were of generally circular transverse cross-section, the base material was tensioned to a tension of the order normally used in filament winding techniques. The machine was then set in motion at a low speed, of the order of 15 rpm, and heating of the base was effected by infra-red heating devices directed towards the base over the whole length thereof in three rows. The glass cloth temperature was thus gradually raised to a temperature approximately in the range 40°–45° C , this being in order to obtain desired viscosity or flow of the resin when applied to reduce conduciveness to air inhibition during resin application.

The machine parts nearest to the stretched base structure were coated with a suitable release agent to guard against overspray during subsequent operations and the following operations were then performed:

The interiors of the cup-shaped portions of the base were coated with a resin by spraying from a spray head introduced through the hollow machine spindles. The resin used was a resin manufactured by the Dow Chemical Co. being a vinyl ester resin DERAKANE 411–45. This had been premixed with promotors as follows: 6% cobalt napthenate solution at 0.4% of the resin content and Dimethyl aniline in the proportion of 3% of the resin content, a catalyst, 60% methyl, ethyl, ketone, peroxide (MEK peroxide), which was metered into the stream of resin in the spray gun at a proportion of 1¾%.

After thorough wetting of the base was thus achieved, so as to bring the resin content of the base to something of the order of 60–65% by weight, spraying was discontinued. At this stage, the resin deposited on the inside of the base displaced any air between the fibres of the cloth and resin through the cloth giving a wet shiny appearance on the outer surface of the base.

The inside of the base was then sprayed with the same resin together with flocking on of glass fibres by means of a flocking gun. The resin was modified so as to give slow to medium gel time as compared with the relatively short gel time used in the first coating this being achieved by modification of the promotors and catalyst content, to proportions 0.3% cobalt napthenate, .25% dimethyl aniline and 1.25% MEK peroxide.

During these and most subsequent coating steps, the rotational speed of the base was maintained at the order of 30 rpm with short bursts of rotational speeds of the order of 120 – 180 rpm to assist in displacement, by resin, of air in the base material.

Filling and reinforcement of the corners of the fins with sprayed resin and flocked fibre was then effected, this time reducing the MEK peroxide content to about 1%. The spraying of these corners was effected by arresting the rotational movement completely three times for each corner and each time rotationally indexing the base to the next corner and in each instance depositing extra resin and fibre.

Rotation of the base was then arrested and spraying of resin and flock effected in a radial direction over the fins.

Rotational movement was then recommenced and spraying effected with resin and fibre simultaneously, the resin being modified this time to give an intermediate gel time by increasing the MEK peroxide content to about 1.5%. A second inner spray with resin was then effected using a relatively short gel time with the MEK peroxide proportion of the order of 2% and with the base once more rotating.

A final inner spray of resin with short gel time and additionally containing paraffin oil as a sealant was then effected. Thus a proportion of 5% wax was added to the 45% styrene content contained in the resin. This solution was added to the gel coat at approximately 1% solution so that wax migrated to the surface, sealing off the resin from the atmosphere and allowing polymerization to proceed uninhibited by contact with the atmosphere.

Two further coatings were then effected with resin and fibre over the cup-shaped tank sections of the base these being effected with a slightly increased MEK peroxide catalyst content of the order of 1¾%.

Four further outer coatings were then effected over the tank portions these being made in such a way as to taper the thickness of coating on the base so that it decreased in directions towards the open extreme ends of the base, which ends are to form tops of the tanks.

Two further coatings were then sprayed with resin and fibre simultaneously with further increased accelerator content to give a shorter gel time while two more coatings were then effected over these with resin with short gel time only. The last of these coatings was the final outer finishing coating, being effected with resin containing paraffin oil sealant as was applied to the surface of the inside of the base.

Between each coating involving simultaneous flocking selective smoothing out of fibres projecting from the main surface area was effected and air pockets were removed by hand rolling.

Curing was effected without the use of external heating sources, the polymerization reaction being exothermic.

The invention provides a simple method which is readily adaptable to the production of a great variety of articles. However, it is to be understood that the invention is not limited to the exemplary methods described or to the exact construction details of the apparatus described, since both may be modified in specific applications. Particularly, the invention is not limited to the use of liquid plastics coating materials, since other materials, such as elastomers, bitumen or metal spray may be employed. Also electrostatic plastics powder spraying, as well as flame spraying methods involving plastics or metals, may be used.

Simultaneously with application of coating material, a suitable reinforcing material such as fibrous or granular filling may be supplied. This reinforcing material may, for example, comprise glass fibre applied by electrostatic flocking operations. In this case an electrode can replace the internal spraying nozzle, movement of the internal nozzle being synchronized with an opposed spraying gun on the outer side of the base. It is also possible to effect coating with foamable materials.

The described mechanism for holding ends of the base material may also be modified.

Figure 5:
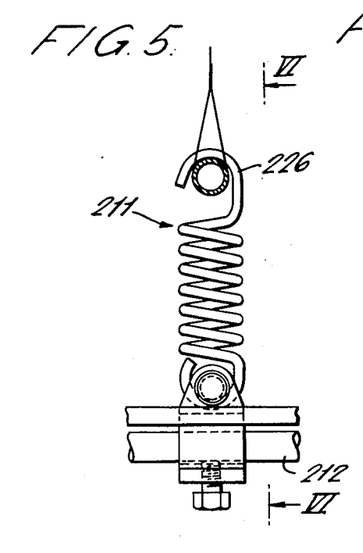
FIG. 5 is a fragmentary side view, like FIG. 3, but showing a modification of the apparatus.
Figure 6:
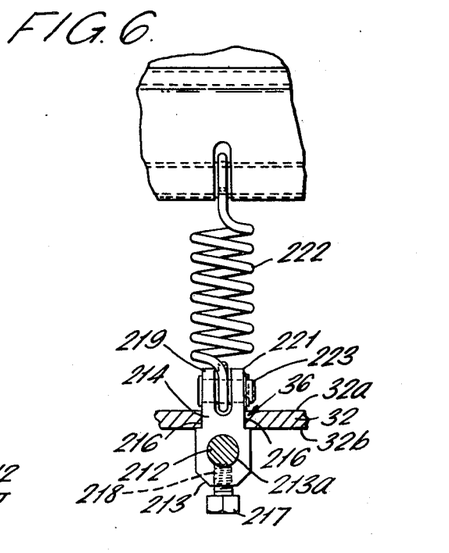
FIG. 6 is a cross-section on the line VI — VI in FIG. 5.

FIGS. 5 and 6 show an alternative form of connector member 211 which can be employed in the apparatus of FIGS. 1 and 2. In this case, the disc 32 (and likewise disc 47) is provided with radial bars 212 of circular cross-section which extend one behind each slot 36, being spaced a short distance behind the outer face 32 (b) of the disc. The connector member shown in FIGS. 5 and 6 includes a body member 213 which has a forwardly projecting portion 214 which extends through the associated slot 36 from outer face 32(b) to inner face 32 (a) of the disc. Body member 213 has a bore 213 (a) therethrough and the associated bar 212 extends through this, the body member thus being freely slidable lengthwise of the bar 212 and thus also slidable lengthwise of the slot 36. Body member 213 has a pair of lateral side surfaces 216 which are spaced so as to be adjacent opposite sides of slot 36 and these prevent substantial rotational movement of the body part about the axis bar 212. Body member 213 can be locked at any desired position along bar 212 and slot 36 by tightening a grub screw 217 which extends through a tapped opening 218 in the body member to engage the bar.

The outer end of the body member which projects from face 32(a) of disc 32 is in the form of a U-shaped yoke having a pair of spaced apart side plates 219, 221. A helical tension spring 222 is secured at an inner end of body member 213 by a pin 223 which extends through plates 219, 221. Spring 222 is freely rotatable about the axis of pin 223, this axis being arranged to be transverse to the direction of extent of the slot 36. The free end of spring 222 has a hook shaped portion 226.

In use, the hook shaped portions of the spring 222 are engaged with loop 230 to hold the ends of the base to the discs.

While it is particularly convenient to utilise the described discs 32 and 47 and connectors 37, these are by no means necessary. For example, wooden end formers of the desired configuration could be used, supported from the discs by means of springs, or a combination of springs and stay-rods of different lengths may be provided if it is desired to mount the end formers obliquely with respect to the discs. Interconnection to the base could of course be provided by means other than the described connectors. Particularly, spring biased clips having jaws of a desired configuration could be employed. If, for example, it was desired to form a circular pipe, there could be two spring clips at each end of the apparatus, each with a pair of semi-circular jaws and with holding means for securing these to form two concentric annular jaws so that the base was held on inner and outer sides, at the ends, between these. This construction avoids the need to form the base with loops 230 at the ends. While the loops 230 are, in the described constructions, of flexible material without any specific form, they could, of course, be made of any desired configuration to give a required shaping to the base as it is coated.

Of course, although normally the base is rotated about its axis, this is not essential. For example, a plurality of bases could be supported between discs 32, 47 disposed about the common axis of rotation of these.

Aside from pure rotational movement it would, of course, be possible to employ oscillatory or other movements. Where rotation or oscillation about a fixed axis is employed, the orientation of the axis is unimportant, vertical rotation, for example, being possible. The movement may be continuous or may be intermittent. It would, for example, be possible to spray coating material from a spray head which successively traverses the length of a stationary base, the base being rotationally indexed after each traverse.

It is possible to wind filamentary material or heated extruded plastics material onto the base as it is rotated. If coating is effected by electrostatic means, the electrode may be positioned within the base as it rotated. It is also possible to apply a reduced air pressure to the interior of the base during coating to reduce air inclusions in the coating. Likewise, increased pressure could be applied, for example to aid in conforming the base to a specific configuration.

The apparatus has been found to make it possible to achieve good dimensional tolerance in articles produced, comparable with metal forming processes. It is possible also to readily and quickly adapt the apparatus to production of a wide variety of differently shaped objects.

These and many other modifications may be made to the described constructions without departing from the spirit and scope of the invention as defined in the appended claims.

I claim:

1. Apparatus for rotating a base of stretchable material about an axis while the material is held in stretched condition at opposed axial ends thereof, the apparatus comprising a support structure, a pair of end members mounted on said support structure for angular displacement about a common axis and spaced apart from each other, drive means for synchronously angularly displacing said end members, holding means mounted upon said end members and adapted to hold opposite ends of said base placed between said end members, tension means operable to bias said ends away from each other thereby to place said base in tension when it is so held, and spray means operable to spray settable material onto said base during angular displacement thereof.

2. Apparatus as claimed in claim 1 wherein said end members comprise discs with radial slots therein and said holding means comprises connector members received in the slots and positionable radially of the discs, said connector members having, at inner ends thereof, hook means for engaging said ends of the base.

3. Apparatus as claimed in claim 2, including a head stock at one end of said apparatus supporting one disc and a tail stock at the other end of said apparatus supporting the other disc, a bed supporting said tail stock for sliding lengthwise of said axis of rotation, and extensible means operable for selectively positioning said tail stock axially relative to said head.

4. Apparatus as claimed in claim 3, including a first shaft rotatable relative to said head stock and having said one disc affixed thereto, and a second shaft rotatable relative to said tail stock and having said other disc affixed thereto, said tension means comprising means for variable axially positioning one of said shafts, the other of said shafts being constrained against substantial axial movement.

* * * * *